(12) United States Patent
Pulkrabek et al.

(10) Patent No.: US 7,833,512 B2
(45) Date of Patent: Nov. 16, 2010

(54) PRODUCTION OF SYNTHESIS GAS FROM BIOMASS AND ANY ORGANIC MATTER BY REACTIVE CONTACT WITH SUPERHEATED STEAM

(76) Inventors: Peter Pulkrabek, 3031 Olcott Rd., Big Flats, NY (US) 14814; Calvin T. Coffey, 2820 County Road 21, Watkins Glen, NY (US) 14891

( * ) Notice: Subject to any disclaimer, the term of this patent is extended or adjusted under 35 U.S.C. 154(b) by 429 days.

(21) Appl. No.: 12/013,493

(22) Filed: Jan. 14, 2008

(65) Prior Publication Data
US 2008/0171899 A1    Jul. 17, 2008

Related U.S. Application Data

(60) Provisional application No. 60/880,490, filed on Jan. 16, 2007.

(51) Int. Cl.
*C01B 3/24* (2006.01)
*C01B 3/26* (2006.01)
(52) U.S. Cl. .................... 423/650; 423/652
(58) Field of Classification Search .............. 423/650
See application file for complete search history.

(56) References Cited

U.S. PATENT DOCUMENTS

| | | | |
|---|---|---|---|
| 4,435,374 A | | 3/1984 | Helm et al. |
| 4,891,459 A | * | 1/1990 | Knight et al. ......... 585/240 |
| 5,961,786 A | * | 10/1999 | Freel et al. .......... 202/121 |
| 6,398,921 B1 | | 6/2002 | Moraski |
| 7,229,483 B2 | | 6/2007 | Lewis |
| 7,241,323 B2 | | 7/2007 | Serio et al. |
| 2007/0204512 A1 | | 9/2007 | Self et al. |
| 2008/0016769 A1 | | 1/2008 | Pearson |

FOREIGN PATENT DOCUMENTS

| | | |
|---|---|---|
| JP | 2006-321945 | 11/2006 |
| WO | WO 0168789 A1 * | 9/2001 |
| WO | WO 03-086991 | 10/2003 |

* cited by examiner

*Primary Examiner*—Melvin C Mayes
*Assistant Examiner*—Kenneth Vaden
(74) *Attorney, Agent, or Firm*—Bernhard P. Molldrem, Jr.

(57) ABSTRACT

Organic matter, i.e., biomass, fibrous plant matter, organic chemicals or organic waste, or other carbon-based matter is converted to synthesis fuel gas by reactive contact with superheated steam at a temperature of about 200 to 2000 degrees C., typically 500 to 1700 degrees. A reactor has a generally tubular envelope, a rotor within the envelope, and hot reaction spaces disposed annularly within the wall of the tubular envelope. The steam and biomass particles can be heated to the required temperatures by RF induction. The product gases include $H_2$, CO, and $CO_2$ in ratios controlled by a programmable controller. Control of temperature, biomass feed rate and water flow preselects the output synthesis gas mix. The synthesis gas may be processed into portable liquid fuels, or can be used directly in a fuel cell.

14 Claims, 3 Drawing Sheets

PRODUCTION OF SYNTHESIS GAS FROM BIOMASS AND ANY ORGANIC MATTER BY REACTIVE CONTACT WITH SUPERHEATED STEAM

Applicants claim priority benefits under Title 35, United States Code, Sec. 119(e) of U.S. Provisional Patent Application Ser. No. 60/880,490, filed Jan. 16, 2007.

BACKGROUND OF THE INVENTION

This invention relates to conversion of biomass, i.e., fibrous plant matter, carbon waste products and organic chemicals (including any toxic compounds such as chlorinated organics, PCBs, etc.) into synthesis gas (useful fuel gases; namely, hydrogen gas and carbon monoxide) and is more particularly concerned with an effective process for converting all plant matter as well as all dried organic material by contact with superheated steam (Flash Hydropyrolysis™).

Biomass is a term used to refer to any material of agricultural origin, and a number of candidate materials that are biomass based can be considered possible feedstock for different energy producing procedures. Some common processes for energy extraction have employed various forms of fibrous plant matter, such as wood chips, straw, hay, corn stalks, or similar agricultural by-products. Manure is sometimes used. It is expected that in future some varieties of plant will be grown and harvested expressly for energy production from the biomass they produce.

Although biomass has a complex composition, if can basically be considered as being composed of three major components, namely, cellulose, hemicellulose, and lignin. These three components together usually form up to about 90% of the dry weight of any biomass material. Dependent on the plant source, the balance is ash (5 to 10%) and small amounts of numerous minor organic materials such as proteins, tannins, essential oils, oils, waxes, pitch, etc.

If the energy of the biomass is extracted by direct burning, then the energy content varies depending on moisture content and other factors. The heat of combustion of a number of dry biomass sources is as follows (in units of Kcal/Kg):

| | |
|---|---|
| Bagasse | 4596 |
| Buckwheat hulls | 4688 |
| Coconut shells | 4827 |
| Oak bark | 4862 |
| Wood: | |
| beech | 4793 |
| birch | 4784 |
| oak | 4586 |
| pine | 5022 |

The noticeably higher heat of combustion of pine wood is due to its high pitch content, with pitch, like lignin, being less oxygenated than cellulose or hemicellulose and therefor containing more available energy (more material available to be oxygenated). The heat of combustion of lignin alone is 5101 Kcal/KG, and that of pitch is 8400 Kcal/Kg. However, regardless of source, dry biomass contains at least about 4500 Kcal/Kg of available energy.

The direct burning of biomass has been an ineffective way of obtaining its energy. The biomass materials, e.g., hay, straw, leaves, seed hulls, etc., are complicated materials that release gases rather quickly during the burning process, but leave the carbon component (typically 70% to 80% by weight), which is difficult to burn. Therefore burning facilities have to be specifically designed and controlled to burn the carbon component and obtain high efficiency.

Biogas (mostly methane) can typically be obtained by the biological breakdown of biomass (i.e., fermentation) in the absence of oxygen. Any biological refuse, such as cattle and pig manure, green parts of plants, corn stalks, straw, hay, wood chips, saw dust, etc., can be used. The bacteria responsible for breakdown are usually mesophiles that grow optimally at temperatures of 37° C. to 43° C., and/or thermophiles that grow at temperatures between 50° C. and 60° C. This is a slow process, and therefore a processing plant needs to be quite large for economical operation. In addition, especially during the growing season, there is a problem with utilization of large amounts of co-produced heat.

Ethanol fermentation from biomass has been discussed as a way of obtaining a liquid, i.e., portable transportation fuel. The current technology for the fermentation of corn (maize) to produce ethanol typically involves fermentation of the edible portion of the plant exclusive of the residual biomass matter (ethanol biomass conversion processes are dependent on the use of simple, fermentable sugars—i.e., monosaccharides or disaccharides). Polymerized sugars like starch (polymeric glucose) or insulin (polymeric fructose) can be used for alcohol fermentation. only after they have been converted to simple saccharides by a process called saccharification. The simple sugars then are fermentable by yeast or certain bacteria. Because only the sweet or food parts of the plant are available, which constitute only a small portion of the plant, ethanol fermentation is not a particularly effective use of the biomass energy content. Furthermore, with existing ethanol technology, only about one-third of fermentable sugars are converted into ethanol. Also, it has been calculated that production of ethanol by fermentation requires about 75% more energy than is eventually contained in the produced ethanol fuel.

Biodiesel is another proposed means for utilizing the renewable resources in the form of agricultural products. While this can be an effective means of using the oily component of the plant, there is only a small available yield of seed oils. It is estimated that if biodiesel fuels were to replace today's oil consumption, it would require 3.0 billion cultivated acres. Also, since only a small portion of the plant is used, this does not present an effective means of utilizing the fibrous component of biomass.

Yields from energy farming currently in place will not be sufficient for estimated national energy consumption unless means are provided to utilize the whole plant for energy production. The average biomass contains in dry mass at least 4,500 kilocalories per kilogram, and this energy content is comparable to many sub-bituminous coals, i.e., brown coals. However, unlike brown coal, the biomass source is an entirely renewable resource, contributing no new carbon dioxide, and its sulfur content is only a very small fraction of that found in coal.

OBJECTS AND SUMMARY OF THE INVENTION

Accordingly, it is an object of this invention to provide a technique for converting all or substantially all of the biomass from a plant into a type of fuel gas that can be used for liquid fuel generation.

It is another object to provide a process and equipment for Flash Hydropyrolysis™ of the biomass, to yield a combustible fuel gas component, and leave only a small, usable ash residue.

In accordance with an aspect of the present invention, the reactive contact with superheated steam (Flash Hydropyrolysis™) uses the entire plant and its every component, i.e., cellulose, hemicellulose, lignin, and other minor components, in the same process, so that the biomass, regardless of source, is converted to biofuel quantitatively. Essentially, only combustible gases (CO and $H_2$), carbon dioxide, and ash will be the final products. The biomass can be used as feedstock for preparation of synthesis gas (CO and $H_2$), by subjecting the biomass to Flash Hydropyrolysis™. The process prevents the products of hydropyrolysis from recombining into a large number of polymerized organic compounds that form creosote or pyrolysis oils; substances that cannot be used directly as liquid fuels.

In the process of our invention, a stream or flow of superheated steam (at least about 300° C., and preferably 500° to 1700° C.) contacts the biomass. At temperatures between 300° and 500° C., the process will proceed, but at a lower rate. There will be conversion of biomass into synthesis gases when the contacting superheated steam is in a temperature range from approximately 200° C. to 2000° C. The water molecules at these elevated temperatures react with the biomass components, acting as both reducing and oxidizing agents, while at the same time providing the heat necessary to drive the hydropyrolysis reaction. The result is a quick reaction of biomass with water, yielding gaseous hydrogen, carbon monoxide, and carbon dioxide. The residue, which is only a small amount of the material, is grey ash, which can be further utilized as fertilizer, or for production of potassium and sodium carbonates or hydroxides. With this process it is possible to convert any kind of biomass to synthesis gas in one step, and in quantity. The synthesis gas is similar in composition to coal-generated "syngas" obtained in the so-called Fischer-Tropsch process. However, the synthesis gas produced by Flash Hydropyrolysis™ has significantly less sulfur component because this process gives us the option of using feedstocks other than coal. Thus, synthesis gas from this process is easier to purify, and is used in the catalytic synthesis of hydrocarbon fuels. The hydrogen produced by this process may also be used as $H_2$ to power fuel cells.

When cellulose, lignin, and hemicellulose are exposed to superheated steam in the absence of oxygen, the biomass is converted to synthesis gas with a gain in energy (i.e., there is more energy available in the resulting combustible gas than in the original biomass feedstock.) A theoretical calculation based on the cellulose component, which is a polymerized glucose $(C_6H_{10}O_5)_n$ follows, with the calculations being based on a single unit of the cellulosic polymer —$C_6H_{10}O_5$—. Three possible reaction modes are examined, where one, three, or seven molecules of water respectively react with one glucose moiety (structural unit) of cellulose.

These three are referred to respectively as "Minimal" "Ideal" and "Full" conversion, and reflect the overall results of the chemical reactions involved.

| I. Minimal conversion. | |
|---|---|
| Chemical reaction: | —$C_6H_{10}O_5$— + $H_2O$ = 6CO + 6$H_2$ |
| Gram molecular weight | 162 + 18 = 168 + 12 |
| (Percent) | 90 + 10 = 93.3 + 6.8 |
| Heat of combustion (Kcal) | 648 + 0 = 407 + 343*** |
| Overall energy situation | 648 + 0 = 747 |
| Energy gain | E = 102 Kcal |

In this theoretical minimal example, 1 gram molecule of cellulose is reacted with 1 gram molecule of superheated steam, resulting in 6 gram molecules of carbon monoxide and 6 gram molecules of hydrogen. When the heats of combustion of the reactant (cellulose) are compared with the heat of combustion of the products, we can see that there is a gain of 102 kilocalories per gram molecule of cellulose. This means that the reaction is endothermic; the additional energy in the sum of the products is a result of utilization of a part of the heat energy originally present in the superheated steam. Because of the gain in energy, the final product has an increased energy value in the form of combustible gases. The gain of energy per kilogram of cellulose equals 640 kilocalories, which corresponds to about 0.733 KWH (1 KWH=860 Kcal) of energy.

| II. Ideal conversion: | |
|---|---|
| Chemical reaction: | —$C_6H_{10}O_5$— + 3$H_2O$ = 4CO + 8$CO_2$ + 8$H_2$ |
| Gram molecular weight | 162 + 54 = 112 + 88 + 16 |
| (Percent) | 75 + 25 = 51.9 + 40.7 + 7.4 |
| Heat of combustion (Kcal) | 648 + 0 = 271 + 0 + 457*** |
| Overall energy situation | 648 + 0 = 728 |
| Energy gain | E = 80 Kcal |

This situation is called "ideal conversion" because the hydrogen and carbon monoxide gases are in the ratio of 2:1 that is ideal for the Fischer-Tropsch synthesis. Here, 54 grams of water are needed to convert 162 grams of cellulose. The reaction is still endothermic, however, it requires only 80 Kcal per gram molecule of cellulose. The gain in energy equals to 494 kilocalories of 0.574 KWH. Lower energy consumption can be explained by oxidation of a part of the cellulosic feedstock to carbon dioxide.

| III. Full conversion: | |
|---|---|
| Chemical reaction: | —$C_6H_{10}O_5$— + 7$H_2O$ = 6$CO_2$ + 12$H_2$ |
| Gram molecular weight | 162 + 126 = 264 + 24 |
| (Percent) | 56 + 44 = 92 + 8 |
| Heat of combustion (Kcal) | 648 + 0 = 0 + 686*** |
| Overall energy situation | 648 + 0 = 686 |
| Energy gain | E = 38 Kcal |

Full conversion occurs when at least seven molecules of water are available for reaction with each one molecule of cellulose. The only products of this reaction are carbon dioxide and hydrogen. This means that the reaction went too far for the purpose of synthesis gas production. This type of reaction could be employed for hydrogen production from biomass which would be similar to steam reformation of natural gas, except that it would be produced from renewable resources. The full conversion reaction is still endothermic, requiring 237 Kcal (1000 g cellulose/162 g moles cellulose× 38 Kcal ~0.237 KWH) to convert fully one kilogram of cellulose.

(***note: These figures reflect the net (low) value, i.e., water resulting from burning remaining in gaseous state, with the gross (high) value including the heat of condensation—which is not our case. This note applies to all three scenarios.)

From the above three calculations, it is clear that the amount of energy that will be absorbed in the resulting gases, i.e., carbon monoxide and hydrogen, is relatively small, i.e., less than one KWH per one KG of cellulose. If only carbon dioxide and hydrogen are the products of a hydropyrolytic reaction ("full conversion"), then the amount of energy necessary is very low indeed. The energy required in the three cases described above decreases with the increasing amount of water used in the reaction. Lower energy demand in scenarios II and III is due to energy provided by the oxidation of carbon atoms to $CO_2$. Oxidation of some of the carbon atoms (and all in scenario III) in the cellulose provide for the higher caloric content in the resulting gases.

The three scenarios described above demonstrate theoretical outcome of hydropyrolysis when cellulose is the starting material. Biomass of course contains other components, and lignin is a significant portion. Due to its higher heat of combustion, the lignin component is actually a somewhat better feedstock material, as it is less oxygenated to begin with.

The practical reactor apparatus must take into account the fact that the biomass feedstock contains at least some moisture, that ideally should be evaporated before the feedstock is brought up to the reaction temperature, and that the biomass needs to be preheated just before the reaction. Drying and heating should utilize waste heat and process heat, including the low grade heat from steam generation, exhaust, and engine cooling of the RF generator.

In the case of the ideal scenario II, it is possible to calculate that the energy required to heat 1000 grams of the cellulosic biomass feedstock to approximately 500° C. is about 192 Kcal; the energy needed to heat the 333 grams of water from 20 to 100° C. and to convert it to steam is about 208 Kcal; and the energy for heating the 100° C. steam to 1000° C. superheated steam is 167 Kcal; for a total of 562 Kcal.

Using a conversion factor of 1 KWH=860 Kcal, this means that about 0.653 KWH of energy is necessary for converting each kilogram of dry cellulose to synthetic gas. Part of this energy is absorbed by the reaction itself, so the exiting synthesis gas will have a temperature reduced below the process temperature. However, the heat stored in the exiting biosyngas can be sent through a heat exchanger to recover some of the energy and use it in pre-heating the incoming water and in drying the biomass feedstock.

Overall Theoretical Yield

The theoretical yield can be calculated as follows for synthesis gas formed as a result of the "Ideal Conversion" reaction:

| —$C_6H_{10}O_5$— | + $3H_2O$ | = $4CO$ | + $8H_2$ | + $2CO_2$ |
|---|---|---|---|---|
| g mol weight: 162 | 54 | 112 | 16 | 88 |
| % | 100 | | 79 | |

From the foregoing, it appears that in this reaction 79% of the cellulose is converted to synthesis gas, with the remaining 21% being carbon dioxide. Only carbon monoxide and hydrogen are reactants in the Fischer-Tropsch synthesis in which one carbon monoxide reacts with two molecules of hydrogen resulting in one —$CH_2$— unit of an aliphatic hydrocarbon as in the following reaction:

| $CO$ | + $2H2$ | = | —$CH_2$— | + $H_2O$ |
|---|---|---|---|---|
| g mol weight: 28 | 4 | = | 14 | 18 |
| % | 100 | | 44 | |

Based on the above two calculations, we can conclude that a theoretical yield of hydrocarbons from dry cellulose would be about 0.79×0.43, which equals 35%. In other words, theoretically from each one kilogram of cellulose, it is possible to obtain 350 grams of hydrocarbons, or 350 KG of hydrocarbons from each metric ton of cellulose. Assuming a density of hydrocarbons being about 0.8 grams per milliliter, this means a yield of about 437 L of hydrocarbons, i.e., 115 US Gallons or 2.75 barrels.

The inventors have run several tests using as reactor in which superheated steam (achieved using RF induction heating) is applied to any biomass material. Superheated steam well above 1000° C. was introduced as a steady stream. The escaping product gases were colorless, did not exhibit any noticeable odor, and burned with a blue flame characteristic of the presence of carbon monoxide and hydrogen. In several tests, the inventors observed gray ashes.

Our tests confirm that applying a flow of superheated steam into a supply of biomass, properly dried and preheated, will produce an effective volume of useful energy gases. These gases (typically $H_2$ and CO) can be burned directly, or can be converted to hydrocarbons via Fischer-Tropsch synthesis. The amount of energy that can be derived from biomass is comparable to the yield from some lower grade coals, but without coal's intrinsic amount of air-polluting sulfur. The energy outlay in drying and preheating the biomass feedstock, and the energy used in creating superheated steam largely ends up in the product gases. Some of the thermal energy of the product gas can be recovered in a regenerative heat exchanger, and used for pre-heating the water, and/or making low-temperature steam, and/or for heating the biomass feedstock.

The reactor for achieving this employs a high-temperature vessel, e.g. quartz glass. Water in the form of low-temperature steam, enters through an inlet feed tube and proceeds through a heater sleeve, i.e., hot zone, which can be heated to the required temperature (e.g., 1000° C.) by means of an RF induction coil. The resultant superheated steam exits this hot zone into the interior of the vessel. The biomass is introduced, e.g., with a screw drive, to the top at a controlled rate so the amount of biomass is matched to the volume of superheated steam. Flash Hydropyrolysis™ occurs on contact. The hot products of the initial Flash Hydropyrolysis™ enter a second hot zone that maintains the biomass and steam at the required temperature under anaerobic conditions. The synthesis gas then exits at the end of the second hot zone as a mixture of simple gases: hydrogen, carbon monoxide, and carbon dioxide. The ratio of the combustible gases can be regulated by controlling the water input, the temperature of the superheated steam, and the rate of feed of the biomass material. Much of the thermal energy in the superheated steam is used in converting the biomass and water into the energy gases. However, there is still considerable thermal energy remaining in the exiting gases, and this can be used to preheat/boil the incoming water and to dry and pre-heat the entering biomass. Drying and pre-heating the biomass feed will improve efficiency of the reactor, but is not an absolute necessity for the process to go forward.

The ash remnant falls to the bottom of the reactor vessel, and can be removed, by periodic cleaning or by a continuous removal and collection for an end product of economic import.

The above and many other objects, features, and advantages of this invention will become apparent to persons

DETAILED DESCRIPTION OF THE PREFERRED EMBODIMENT

Figure 1:
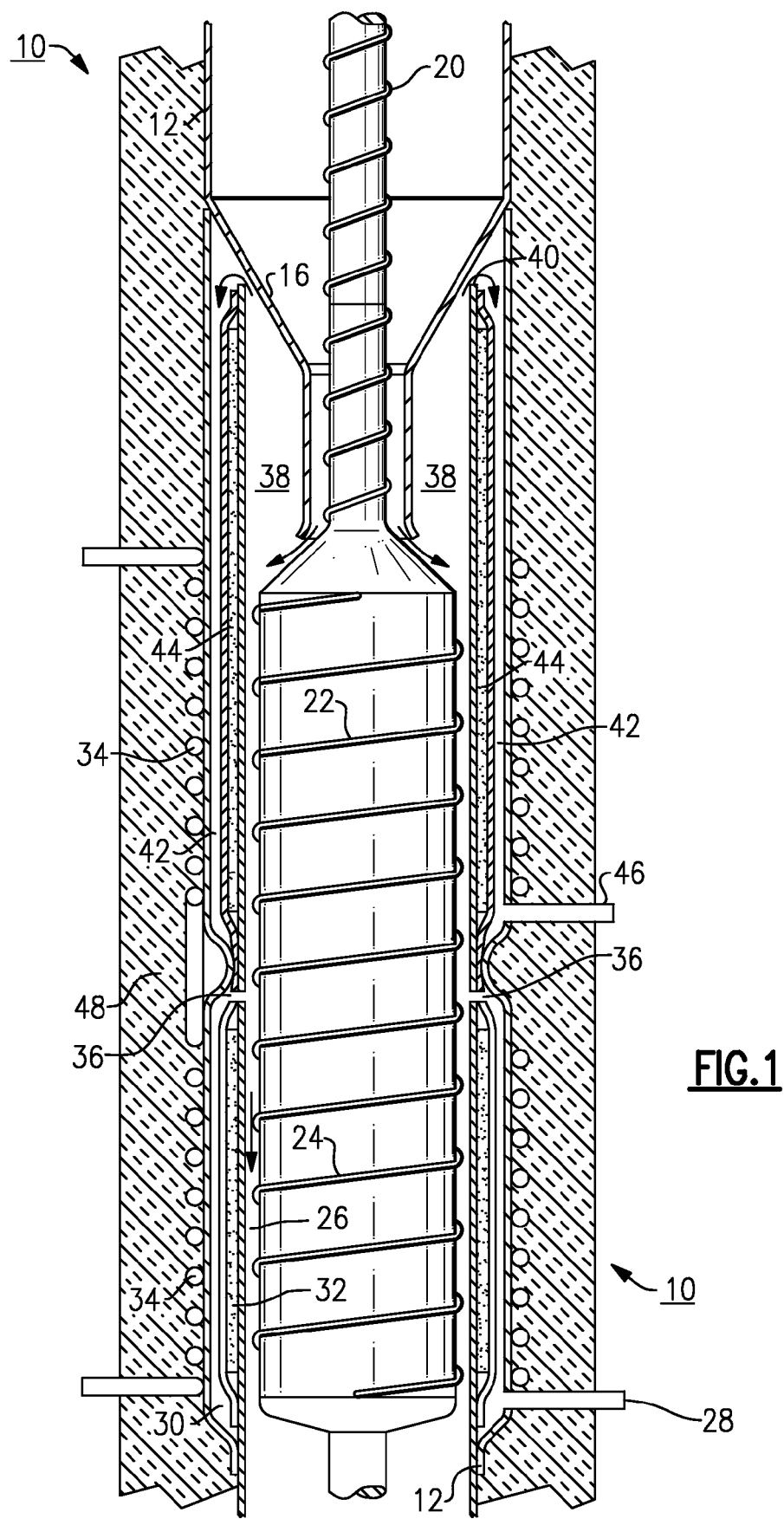
FIG. 1 schematic elevation of a reactor vessel for carrying out the Flash Hydropyrolysis™ of biomass according to an embodiment of the invention.

With reference to the Drawing, and initially to FIG. 1, a Flash Hydropyrolysis™ reactor 10 is shown for carrying out a continuous or batch process generation of synthesis gases from biomass matter of the type described hereinabove. The biomass is chopped when harvested to a size standard, and is allowed to pre-dry. The reactor is formed of a generally tubular quartz envelope 12, which houses a rotor 14 as shown which rotates to bring the biomass particles into contact with the superheated steam as explained. The upper end of the envelope can be much higher as indicated by the break lines, and the inlet for bringing in fresh biomass is not shown here.

There is a neck or funnel 16 surrounding a thinner portion 18 of the rotor, with the rotor 14 widening beneath the lower mouth of the funnel 16. The bottom of the vessel or envelope 12 extends down, as indicated at the lower break lines, and can receive a considerable volume of the ash. Threads, vanes or screws 20, 22, 24 are formed on the outer wall of the rotor 14, to act as a conveyor in feeding the biomass particles into the main contact area 26, which is an annular space between the rotor 14 and the tubular wall of the reactor vessel.

Pre-heated water (either liquid or low-temperature steam) enters through a water inlet port 28 into a steam zone 30, which is an annular space surrounding the vessel envelope. There is a carbon (i.e., graphite) susceptor 32 situated in an evacuated space in contact with the steam zone 30. Induction coils 34 are shown here disposed just outside the vessel outer wall, and these induce a current on the carbon susceptor 32 to generate the heat necessary to produce superheated steam at temperature of at 500° to 1700° C. The superheated steam exits through steam ports 36 into the annular contact area 26.

The biomass material is driven down below the mouth of the funnel 16 into this area 26 where it contacts the flow of superheated steam. Here, the biomass and steam produce Flash Hydropyrolysis™ creating product gases discussed above, i.e., hydrogen gas, carbon monoxide, and carbon dioxide, as well as complex volatile compounds which are subjected to further thermally-induced hydro breakdown (Secondary Hydroflashing™) to prevent their condensation and coalescence into high-molecular-weight pyrolysis oil. The steam and biomass and product gasses enter a zone 38 situated just outside the funnel, and some of the heat is transferred to the incoming biomass feed for pre-heating and drying same. Then the product gases and steam exit via gas ports 40 into an annular reaction zone 42. Here, there is another carbon susceptor 44 situated in an evacuated space in contact with the reaction zone 42, which receives induced energy from the RF induction coils 34. The gases proceed downward and exit the reaction zone out a synthesis gas exit port 46.

The biomass feedstock material is introduced into the upper part of the reactor envelope 12, and is drawn downward by turning of the rotor 14. The rotor can move up and down to open and close the space between the rotor and the lower end of the funnel 16 to limit the amount of feedstock entering and also to keep the process gases in the reaction spaces. The steam and synthesis gas entering via the ports 40 into the Secondary Hydroflashing™ zone 42 complete the conversion of complex volatile organic compounds into synthesis gas, and tend to use their thermal heat in the chemical conversion to the synthesis gas, so the susceptor 44 serves to keep the temperature up in this zone so the process can go to completion.

The screws or vanes 20, 22, 24 keep the biomass directed to the hot zone, but ensure that the resulting ash moves towards the bottom of the reactor vessel. The product biosyngas leaves through the exit port 46 to a heat exchanger, discussed shortly, for preheating the incoming water entering the inlet port 28. Then, the product gases proceed to a further process, which can be a storage tank, or a catalytic converter, or other system.

The vessel is shown here with a layer of encapsulated insulation 48 surrounding the same.

Figure 2:
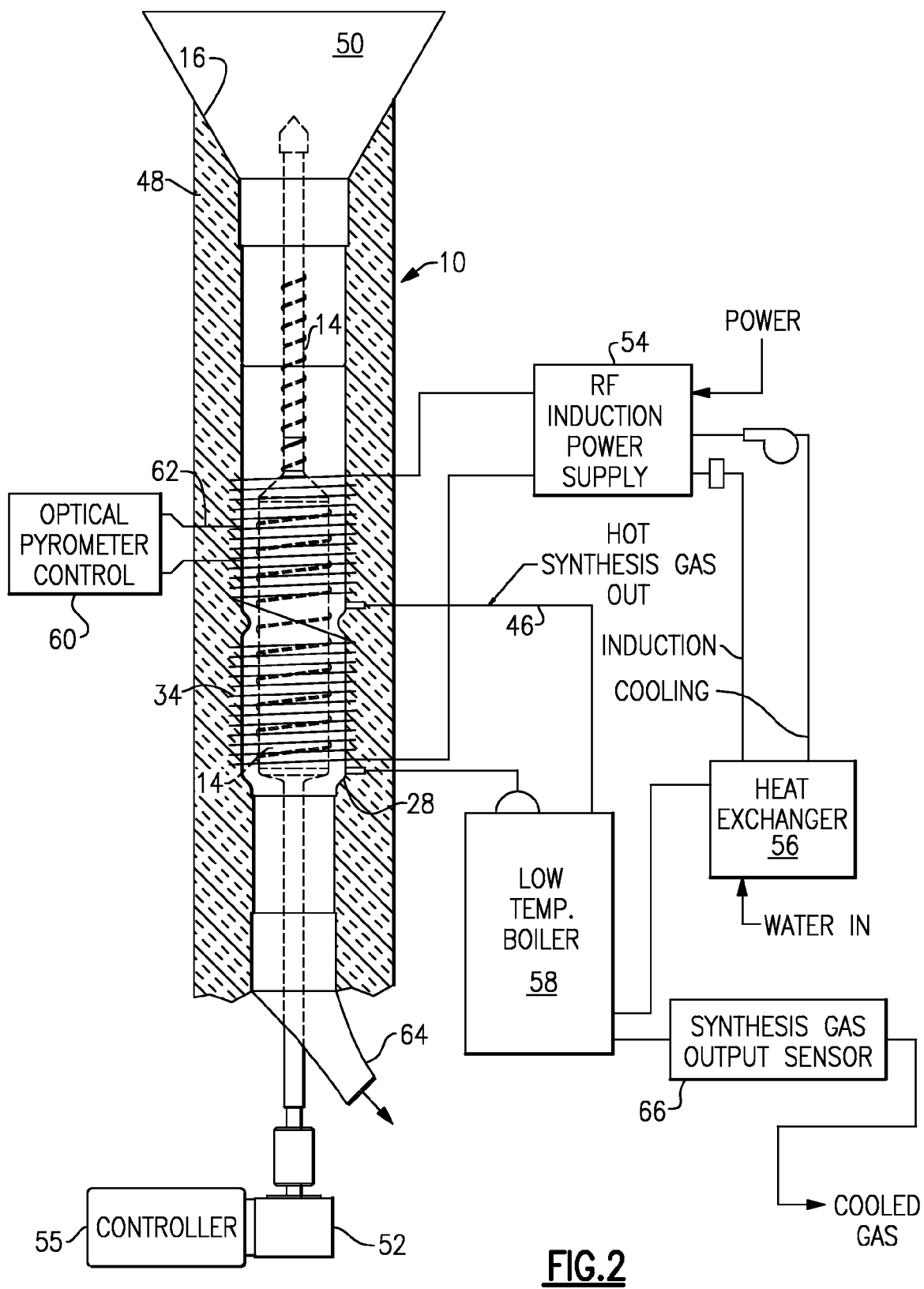
FIG. 2 is a system diagram of a biomass Flash Hydropyrolysis™ system of this embodiment.

As shown in FIG. 2, a practical system to handle the cooled synthesis gas would include a biomass supply tank or hopper 50, with a motor driven screw drive 52, or other means, to feed the biomass feedstock into the reactor vessel 10. An RF induction current generator or power supply 54 provides an alternating current drive at the appropriate power and frequency to the induction coils 34. The induction current power supply 54 sends power to the coil 34 to maintain a given temperature set-point, and that set-point can be adjusted up or down. A motor controller 55 controls the screw drive 52 to rotate the shaft of the rotor 16, which can also provide for the limited vertical motion needed as discussed above. Finally, a boiler 56 and regenerative counterflow heat exchanger 58 recovers some of the heat of the synthesis gas product exiting via the port 46 and use this heat to pre-heat and/or boil the entering water going to the inlet port 28. An optical pyrometer control device 60 has a pyrometric sensor 62 in optical contact with the hot zone 42 to monitor the Secondary Hydroflashing™ process that is being carried out there. The output from the control device 60 can be used in controlling the RF current applied to the coils 34. At the lower end 64 of the reactor vessel is a door or valve for removing accumulated ash. An output sensor 66 measures the output flow of the cooled synthesis gas, and provides this to programmable logic controller (not shown), which also receives input from the optical pyrometer control 60. The controller will regulate temperature by adjusting power, feed rate of organic matter by adjusting rotor speed, and volume of superheated steam by controlling water flow rate. Control of these parameters will preselect the system output for the production of synthesis gas or hydrogen. While not shown here, there are various other items employed and the skilled engineer would understand how to install and control these. This would include, for example, a water pump for the incoming process water as well as water filters and other purification means, as well as thermometers, pressure gauges, and monitors to check on the quality of the incoming biomass feedstock and the exiting synthesis gas product.

Figures 3, 4:
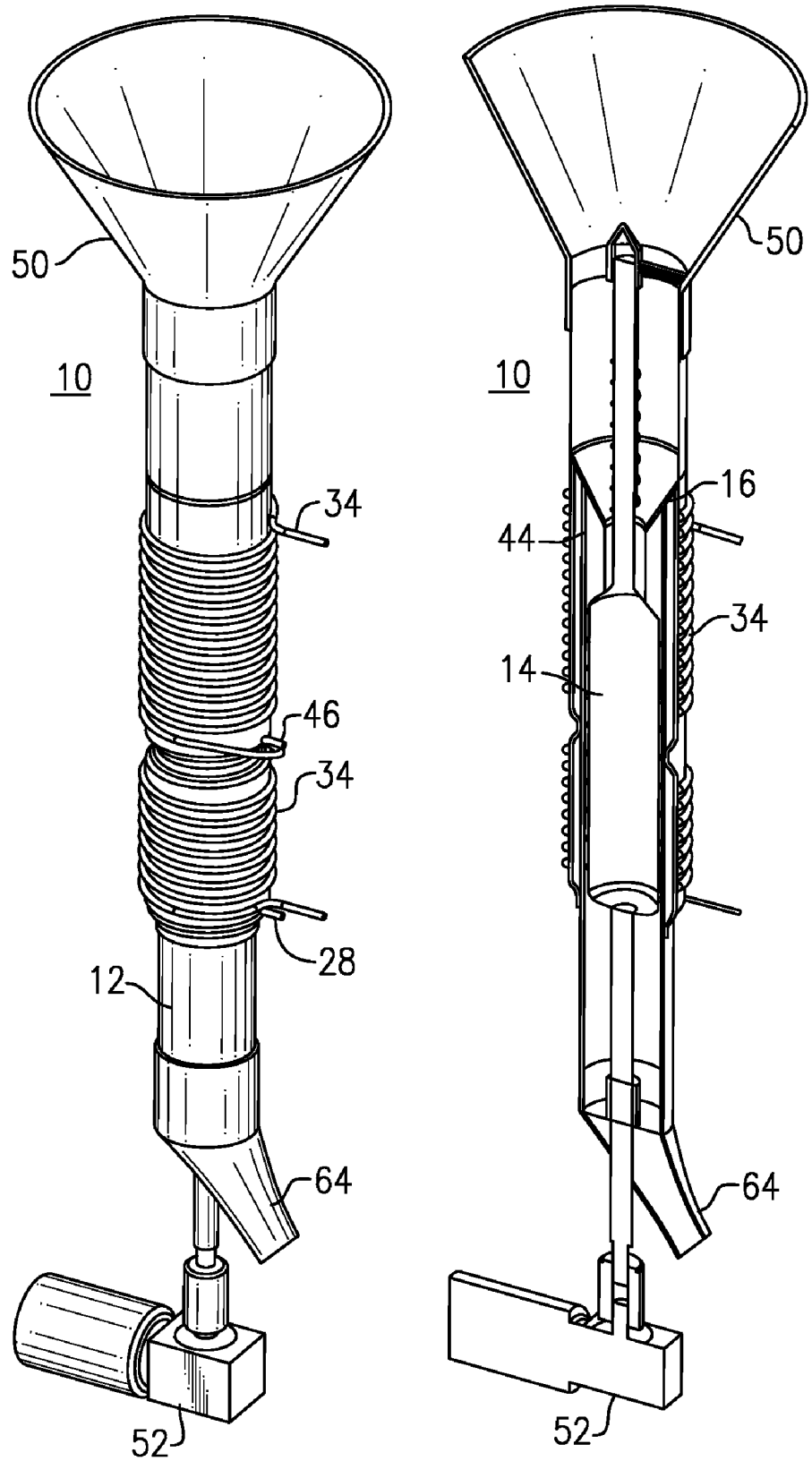
FIGS. 3 and 4 are a perspective view and a cutaway perspective view, respectively, of the reactor vessel of this embodiment.

FIGS. 3 and 4 are perspective and cutaway perspective views of the reactor vessel 10, showing the funnel 50, envelope 12, coil 34 and rotor 14 in one practical implementation. Reference numbers used in FIGS. 1 and 2 identify the same elements as described in respect to those views, and a detailed description is not repeated.

While the invention has been described in detail with respect to one preferred embodiment, it should be recognized that there are many alternative embodiments that would become apparent to persons of skill in the art. The device as described and its geometry can be changed to meet the demands of flow and output for specific requirements, i.e., the diameter and length of the reactor can be increased to meet capacity demands. Also, multiples of the reactor can be arranged in banks of standard sized units to accomplish such goals. The reactors can be configured for batch operation of for continuous flow operation. A continuous flow reactor can be arranged for high flow-through, to eliminate the need for large in-process storage. Many modifications and variations are possible which would not depart from the scope and spirit of this invention, as defined in the appended claims.

We claim:

1. A process for converting biomass and any other organic material to useful energy gases, comprising
    supplying a feed of said biomass as dried, pre-heated particles to a reactor wherein said reactor is formed of a quartz glass or other refractory non-corrosible material;
    generating superheated steam within said reactor;
    subjecting the biomass particles in a primary reaction zone in the reactor to a stream of said superheated steam having a temperature in a temperature range of sufficient temperature to cause pyrolysis of the biomass and steam under anaerobic conditions to produce production gases;
    passing said steam and said production gases through a secondary reforming zone within the reactor to convert any residual volatile organic compounds and said superheated steam to said energy gases, the latter including one or more of hydrogen and carbon monoxide; and
    adding thermal energy to said superheated steam while the superheated steam is in said secondary reaction zone.

2. The process of claim 1 wherein said superheated steam is contacted with the biomass particles at a temperature of 300° C. to 1700° C.

3. The process of claim 1 wherein said superheated steam is applied to the biomass particles while in a temperature range of 700° C. to 1700° C.

4. The process of claim 1 comprising producing said superheated steam by RF inductive heating of a susceptor in thermal contact with water vapor used to generate said superheated steam.

5. The process of claim 1 wherein the energy gases produced in the reactor exit the reactor at an elevated temperature, and such exiting energy gases are placed in thermal contact with entering water that is introduced into the reactor to produce said superheated steam.

6. The process of claim 1 comprising thermally contacting exiting energy gases with the incoming water to preheat the water by sending the exiting energy gases into a regenerative heat exchanger.

7. The process of claim 1 comprising reducing the biomass particle to energy gases and a mineral ash.

8. The process of claim 7 wherein said ash includes a salt or hydroxide of potassium.

9. The process of claim 8 further comprising processing said ash to adapt the ash to be utilized as a fertilizer.

10. The process of claim 1 comprising regulating the relative amounts of hydrogen and carbon monoxide in said energy gases by
    controlling the rate or water vapor input;
    controlling the temperature of the superheated steam; and
    controlling the feed rate of said biomass particles.

11. The process of claim 10 including maintaining temperature of the superheated steam, rate of water vapor input, and feed rate of said biomass particles such that volatile complex components produced in said reaction are prevented from producing high-molecular-weight pyrolysis oils.

12. The process of claim 1 comprising passing said superheated steam and said energy gases together with other product gases produced in said reactor through a counterflow stage for continued energy injection to convert said other gases into simple product gases.

13. The process of claim 1 wherein said biomass comprises a mixture of waste materials of vegetable origin.

14. The process of claim 1, wherein the process of conversion of said biomass particles and said superheated steam to said energy gases free of pyrolysis oils takes place entirely within a single reactor.

* * * * *

UNITED STATES PATENT AND TRADEMARK OFFICE
CERTIFICATE OF CORRECTION

| | | |
|---|---|---|
| PATENT NO. | : 7,833,512 B2 | Page 1 of 1 |
| APPLICATION NO. | : 12/013493 | |
| DATED | : November 16, 2010 | |
| INVENTOR(S) | : Peter Pulkrabek et al. | |

It is certified that error appears in the above-identified patent and that said Letters Patent is hereby corrected as shown below:

Col. 2, line 25: the "." in between the words 'fermentation' and 'only' should be deleted.

Signed and Sealed this
Eleventh Day of January, 2011

David J. Kappos
*Director of the United States Patent and Trademark Office*